(12) United States Patent
Uguen et al.

(10) Patent No.: US 7,579,713 B2
(45) Date of Patent: Aug. 25, 2009

(54) VOLTAGE CONVERTER FOR CONVERTING A VOLTAGE TO MULTIPLE OUTPUT VOLTAGES AND METHOD OF OPERATING SAID VOLTAGE CONVERTER

(75) Inventors: Emeric Uguen, La Fresnaye au Sauvage (FR); Patrick Emanuel Smeets, Weert (NL)

(73) Assignee: NXP B.V., Eindhoven (NL)

( * ) Notice: Subject to any disclaimer, the term of this patent is extended or adjusted under 35 U.S.C. 154(b) by 69 days.

(21) Appl. No.: 11/576,813

(22) PCT Filed: Oct. 3, 2005

(86) PCT No.: PCT/IB2005/053242

§ 371 (c)(1),
(2), (4) Date: Oct. 12, 2007

(87) PCT Pub. No.: WO2006/038175

PCT Pub. Date: Apr. 13, 2006

(65) Prior Publication Data

US 2008/0265671 A1    Oct. 30, 2008

(30) Foreign Application Priority Data

Oct. 8, 2004    (EP) .................................. 04300667

(51) Int. Cl.
H02J 1/10    (2006.01)
(52) U.S. Cl. ........................................................ 307/58
(58) Field of Classification Search .................... 307/58
See application file for complete search history.

(56) References Cited

U.S. PATENT DOCUMENTS

| 5,617,015 | A | 4/1997 | Goder et al. |
| 5,929,615 | A | 7/1999 | D'Angelo et al. |
| 6,998,825 | B2 * | 2/2006 | Nagaoka et al. ............. 323/222 |
| 2006/0007618 | A1 | 1/2006 | Leyk et al. |

FOREIGN PATENT DOCUMENTS

EP    1067662 A    1/2001

* cited by examiner

*Primary Examiner*—Robert L. Deberadinis

(57) ABSTRACT

The invention relates to an voltage converter for converting a voltage to multiple output voltages, comprising a first switching circuit (SO) connected to an inductive energy storage element (L) for allowing and interrupting a current flow through the inductive energy storage element (L); at least two second switching circuits (S1) for a controllable discharging of the energy stored in the inductive energy storage element (L), each second switching circuit (S1) being connected to the inductive energy storage element (L) in parallel connection to each other at its respective input and each second switching circuit (S 1) comprising a parasitic element; control voltage selection means for selectively supplying a control voltage to the parasitic element of the switching circuits (S1) such that a current flow trough the parasitic element of the respective switching circuit (1) is inhibited when the second switching circuit (S1) is turned off. A negative influence of parasitic elements (e.g. diodes) can be suppressed by a suitable selective control of the bulk voltage.

9 Claims, 2 Drawing Sheets

VOLTAGE CONVERTER FOR CONVERTING A VOLTAGE TO MULTIPLE OUTPUT VOLTAGES AND METHOD OF OPERATING SAID VOLTAGE CONVERTER

FIELD OF THE INVENTION

The invention relates to a voltage converter for converting a voltage to multiple output voltages.

The invention further relates to a power management unit comprising a voltage converter according to the first paragraph.

The invention further relates to a mobile device comprising a power management unit according to the second paragraph.

The invention finally relates to a method of operating a voltage converter according to the first paragraph.

BACKGROUND OF THE INVENTION

The present invention can be used in for example, power supplies or mobile device such as mobile phones, personal digital systems (PDAs) or laptops. Voltage converters with multiple output voltages are generally used to derive multiple DC-output voltages from a DC-input voltage source. These output voltages can have a higher voltage level than the DC-input voltage. Voltage converters are usually referred to as DC/DC-voltage converters or switch mode power supplies (SMPS). So-called DC/DC-converters are generally known in the art. A voltage converter comprises energy storing means, such as an inductor, to store energy obtains from a DC-input voltage source. This energy is subsequently used to generate multiple output voltages. The energy storing means are cyclically charged and de-charged and the flow of energy from the energy storing means to the outputs of the voltage converters is controlled by means of digital control switch devices.

However, such switch circuits are usually comprising transistors in most technique as switching elements. Due to their structure, such transistors comprise parasitic elements, for example parasitic diodes, which will create substantial switching losses and disadvantageously influence the regulation for a stable output voltage.

OBJECT AND SUMMARY OF THE INVENTION

It is therefore an object of the invention to provide a voltage converter of the type defined in the first paragraph and a power management unit of the type defined in the second paragraph and a mobile device comprising a power management unit of the type of the third paragraph and a method of operating a voltage converter of the type defined in the fourth paragraph in which the above-mentioned disadvantages are overcome.

In order to achieve the object defined above, with a voltage converter according to the invention characteristic features are provided so that a voltage converter according to the invention is characterized defined below, that is:

Voltage converter for converting a voltage to multiple output voltages, comprising a first switching circuit connected to an inductive energy storage element for allowing and interrupting a current flow through the inductive energy storage element; at least two second switching circuits for a controllable discharging of the energy stored in the inductive energy storage element, each second switching circuit being connected to the inductive energy storage element in parallel connection to each other at its respective input and each second switching circuit comprising a parasitic element; control voltage selection means for selectively supplying a control voltage to the parasitic element of the switching circuits such that a current flow trough the parasitic element of the respective switching circuit is inhibited when the second switching circuit is turned off.

In order to achieve the object defined above, with a power management unit according to the invention characteristic features are provided so that a power management unit according to the invention can be characterized in the way defined below, that is:

Power management unit comprising a voltage converter comprising a voltage converter according to each one of the preceding claims 1 to 4.

In order to achieve the object defined above, with a mobile device according to the invention characteristic features are provided so that a mobile device according to the invention can be characterized in the way defined below, that is:

Mobile device comprising a power management unit according to claim 5.

In order to achieve the object defined above, with a method of operating a voltage converter according to the invention characteristic features are provided so that a method of operating a voltage converter according to the invention can be characterized in the way defined below, that is:

Method of operating a voltage converter for converting an input voltage to multiple output voltages according to claim 1 comprising the following steps:

storing of energy in the inductive energy storage element by means of the first switching circuit; selectively discharging of the energy stored in the inductive energy storage element by means of the second switching circuits in order to produce multiple output voltages, each second switching circuit being connected to the inductive energy storage element in parallel connection to each other at its respective input side and each second switching circuit comprising a parasitic element; selectively supplying of a control voltage to the parasitic element of the second switching circuits such that a current flow through the parasitic element of the respective switching circuit is inhibited when the second switching circuits is turned off.

The characteristic features according to the invention provide the advantage that a voltage converter is provided which contains switching circuits comprising parasitic elements such as parasitic diodes, which can be suitable controlled so that switching losses can be reduced and a negative influence of the regulated output voltage can be avoided. The characteristic features of a power management unit according to the invention provide the advantage that by using a voltage converter according to the invention will provide for a compact and reliable power management unit which can be used in all kinds of consumer electronics which need to have specific power supplies such a mobile phones or electronic cameras or laptops etc.

The characteristic features of a mobile device according to the invention provide the advantage that such a device can relay on a reliable and compact power management unit by using a voltage converter according to the invention.

Finally, the characteristic features of the method of operating a voltage converter according to the invention provides for a effective control of parasitic elements within a voltage converter according to the invention.

The measures as claimed in claim 2 and claim 8 respectively provide the advantage that the voltage converter can be controlled by digital control signals to provide multiple regulated (i.e. feedback controlled) output voltages.

The measures as claimed in claim 3 and claim 9 respectively provide the advantage that even in a case where not all output voltages of the voltage converter are used, the suppression of a current flow through a parasitic element of unselected switching circuits is ensured.

The measures as claimed in claim 4 provide the advantage that the voltage converter can be implemented in a compact size suitable to be incorporated into mobile devices.

The aspects defined above and further aspects of the invention are apparent from the examples of embodiment to be described herein after and are explained with reference to these examples of embodiment.

BRIEF DESCRIPTION OF THE DRAWINGS

The invention will be described in more detail herein after with reference to the examples of embodiment but to which the invention is not limited.

DESCRIPTION OF EMBODIMENTS

Figure 1:
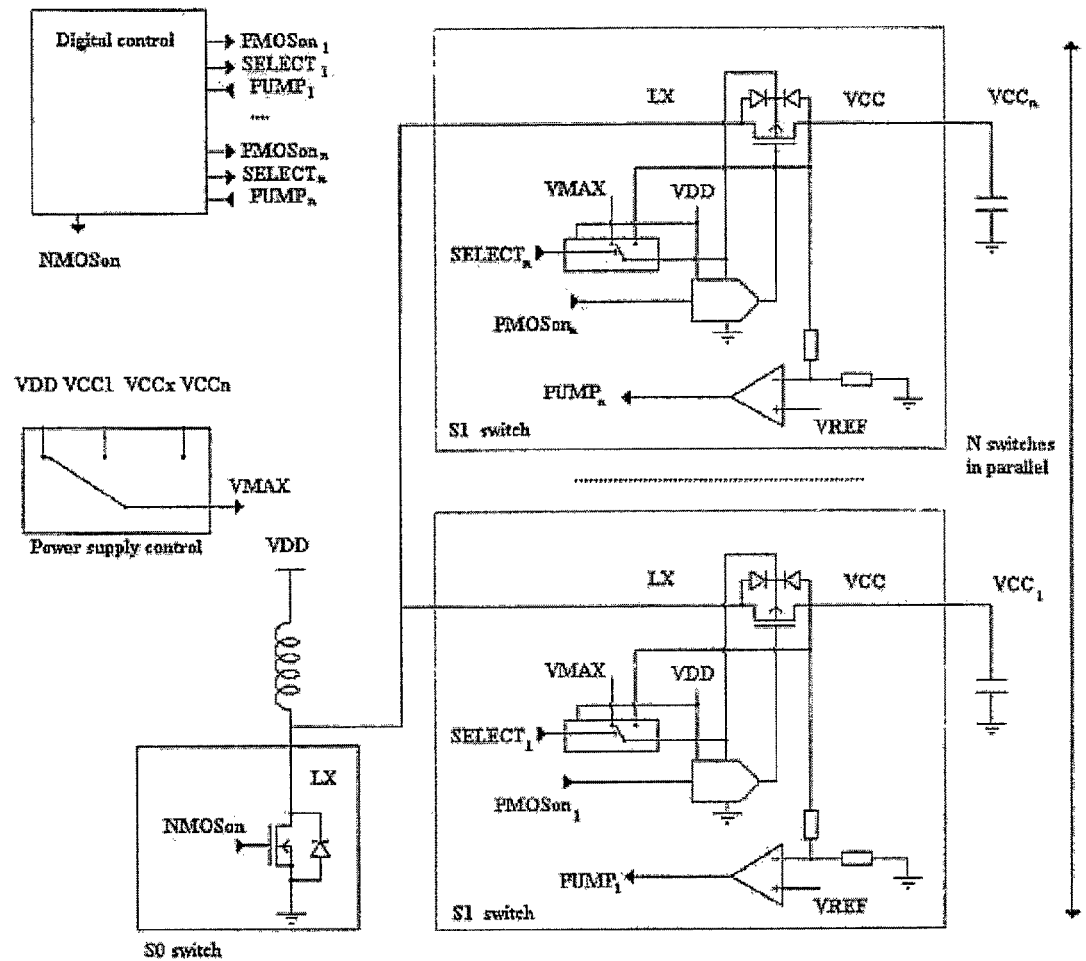
FIG. 1 shows a voltage converter according to an embodiment of the invention in form of a block diagram.

FIG. 1 shows an overall view of a voltage converter, namely a so called DC/DC converter for converting an input voltage to multiple output voltages according to an embodiment of the invention.

The DC/DC converter comprises a first switching circuit S0 which is connected to a inductive energy storage element L such as a coil which in turn is connected to a supply voltage VDD. Multiple second switching circuits S1 are connected in parallel to the first switch circuit S0 at the circuit point LX at one and of the inductive energy storage element L.

Each second switching circuit S1 provides for an output voltage, which output voltages are different among each other. The output voltages can be obtained at a capacitor C which is connected to the output of each second switching circuit S1.

The DC/DC converter furthermore comprises a determination circuit DET which has inputs for each output voltage of the DC/DC converter and the input voltage VDD of the DC/DC converter and an output providing a voltage VMAX. The determination circuit determines the highest available voltage among the switching circuits S1 and the input voltage VDD and provides it at is output as the voltage VMAX.

The DC/DC converter furthermore comprises a digital control DC which receives and provides digital control signals from/to the first and second switching circuits S0, S1 to selectively operate these switching circuits S0 and S1. Furthermore, the digital control DC receives a digital signal from each second switching circuit S1 indicating that the output voltage associated with this second switching circuit S1 has dropped below a reference voltage Vref. Upon receipt of a digital signal $PUMP_n$ the digital control performs a switching sequence via control signals $SELECT_n$, $PMOSon_n$ and $NMOSon$ as will be explained later to increase the voltage at the respective S1 switching circuit from which the $PUMP_n$ signal was received.

The first switching circuit S0 comprises a NMOS transistor to which a diode is connected in parallel.

Each second switching circuit S1 comprises a PMOS transistor, a level shifter LS, a selection circuit and a comparator.

The comparator compares a reference voltage VREF with the output voltage associated with this second switching circuit S1 and the output of the comparator provides a digital control signal PUMP to the digital control DC. The level shifter LS has an input which receives the digital control signal PMOSon from the digital control DC and an output which is connected to the gate of the PMOS transistor. The selection circuit is connected to the back gate of the PMOS transistor for controlling the bulk voltage of the PMOS transistor. The selection circuit receives a digital signal $SELECT_n$ from the digital control and provides a control voltage for the bulk voltage of the PMOS transistor. By means of this control voltage a parasitic diode can be reversely biased so that no current flow through the PMOS transistor into the bulk is possible. The selection circuit can select between a voltage VMAX provided by the voltage determination circuit DET and the output voltage of the second switching circuit S1 associated with that output voltage VCCi.

According to one embodiment, the voltage determination circuit DET can be omitted in the case that all output voltages of the DC/DC converter are used. In this case the highest available voltage of the DC/DC converter is known beforehand and does therefore not need to be determined. However, if not all output voltages provided by the DC/DC converter are used, the highest output voltage available in the DC/DC converter is not predetermined and therefore has to be determined by means of the determination circuit DET. To determine the highest output voltage out of all output voltages of the DC/DC converter, many methods are well known in the art and therefore not described.

The digital control DC controls only one branch at a time by repeatingly performing a switching sequence to raise the output voltage upon the receipt of a transition in the PUMP signal of the respective switching circuit S1 indicating that the output voltage associated with this switching circuit S1 has dropped below the reference voltage Vref and must be increased. To control all parallel second switching circuits S1 almost simultaneously, the digital control DC and the switching circuits may be operated in a multiplexing mode.

During the performing of a switching sequence for one particular output voltage the parasitic elements such as parasitic diodes have to be kept reversely biased to suppress any current flow into the bulk of the PMOS transistor in a turned off state of the transistor which would otherwise reduce the current flow in the branch of the DC/DC converter currently performing a switching sequence and create switching losses. Such switching losses would result in a increased heating of the DC/DC converter circuit and would shorten the life time of the DC/DC converter.

To this end, control voltage selection means comprising the selection circuit and the determination circuit DET provide for a suitable control voltage which is applied to the back gate of each PMOS transistor to reversely bias the parasitic diode. Since all second switching circuits S1 are connected in parallel, they have all the same voltage applied and therefore the highest voltage available in the DC/DC converter must be applied to the back gate of the PMOS transistor which are turned off to secure that the parasitic diode is reversely biased. On the other hand, the one second switching circuit S1 which has been selected via SELECT signal to perform a switching sequence for increasing the respective output voltage need to comprise a parasitic diode in order to prevent destroying of the circuit elements by an excessive current due to the fast rise of the voltage at the coil if the first switching circuit S0 is turned off.

However, in one embodiment where all output voltages of the DC/DC converter are used, the control voltage selection means will comprise only the selection circuit since the highest available output voltage is known beforehand. For example, if the DC/DC converter has three output voltages 3 Volt, 5 Volt, 15 Volt and a supply voltage of 3 Volt, VMAX is 15 Volt and is applied to each second switching circuit S1 which is not selected for a switching sequence by the digital control DC.

This means, that the parasitic diodes are controlled by control voltage selection means in a way that all parasitic diodes in branches which are not selected for the switching sequence are reversely biased. Only the second switching circuit S1 which is currently performing a switching sequence has a parasitic diode which is not reversely biased so that the parasitic diode is able to limit the rise in the current upon turning off of the first switching circuit S0 and thereby to protect the circuit elements of the DC/DC converter against destruction.

All components in FIG. 1 as previously described, can be incorporated in the one single IC chip package to provide for a compact size. Such a DC/DC converter of compact size can be easily used in a power management unit of a mobile device such as a handy, an electronic camera, a laptop or the like. In fact, almost every consumer electronic device can be provided with such a power management unit.

Next, referring to FIGS. 2 and 3, the operation of the DC/DC converter will be explained.

Figure 2:
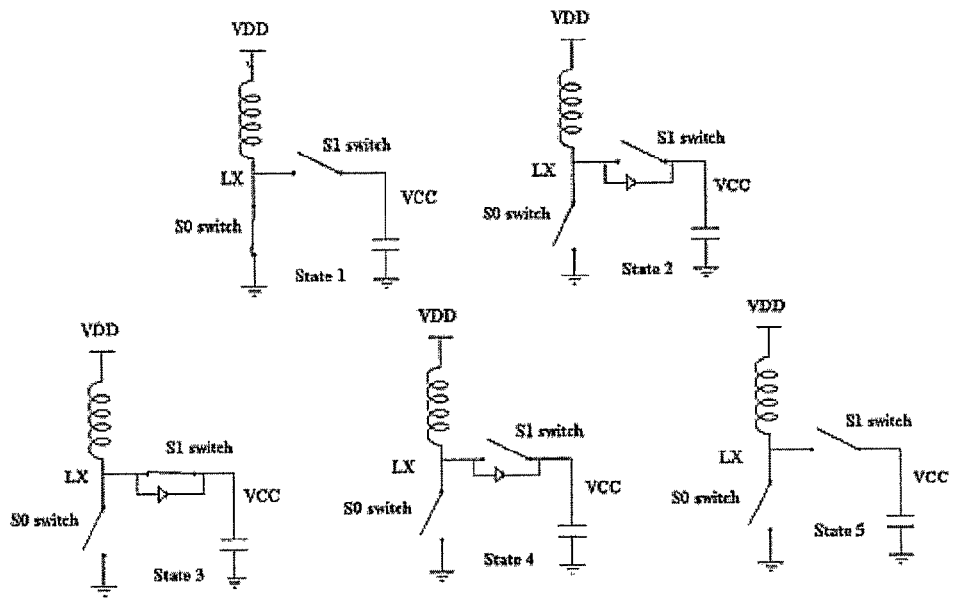
FIG. 2 shows one converting branch of the voltage converter in different states during a switching sequence of the voltage converter according to the invention.

FIG. 2 shows only one branch of the DC/DC converter according to an embodiment of the invention, which is controlled by the digital control DC to perform a switching sequence to convert an input voltage VDD to an output voltage VCC. In FIG. 2, the first switching circuit S0 is only schematically illustrated as a "S0 switch" and the second switching circuit S1 is schematically illustrated as a "S1 switch".

In state 1, the S0 switch is closed and the S1 switch is open so that the inductive energy storage element, i.e. the coil stores energy. If the digital control DC determines a transition in the PUMP signal of a S1 switch indicating that the output voltage associated with this switch has dropped below a reference voltage Vref, the digital control DC starts to initiate the switching sequence by sending digital control signals NMOSon, PMOSon and SELECT to the respective S1 switch associated with the determined PUMP signal.

Table 1 is a truth table showing the logical levels of the digital control signals PMOSon and SELECT and the gate voltage of the PMOS of the respective switch S1 as well as the bulk voltage according to the back gate voltage of the respective PMOS transistor.

TABLE 1

| PMOSon | SELECT | Gate voltage of the PMOS (switch S1) | Bulk voltage |
|---|---|---|---|
| Low | Low | VMAX | VMAX |
| High | Low | 0 | VMAX |
| Low | High | VCCx | VCCx |
| High | High | 0 | VCCx |

As can be seen from this table, VMAX is applied to the bulk as long as the signal SELECT is low, in order to reversely bias the parasitic diode. Since VMAX is the maximum voltage of the DC/DC converter, the parasitic diode is reversely biased irrespective of the output voltage of the S1 switch currently performing a switching sequence.

The switching sequence for rising the output voltage of a certain branch of the DC/DC converter associated with a output voltage which has dropped below a reference voltage Vref starts in state 1 where energy has been stored in the coil for a certain time T1.

Figure 3:
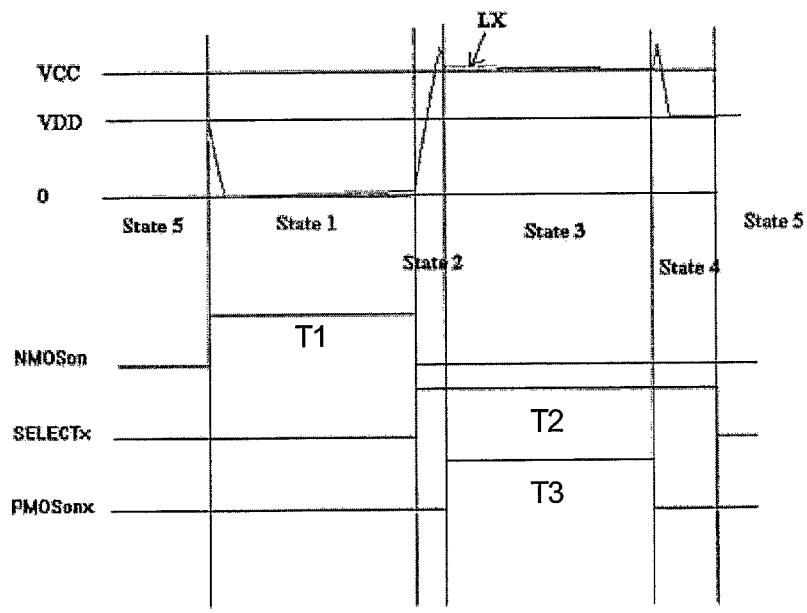
FIG. 3 shows a chronogram of the digital control signals throughout the states which relate to the states in FIG. 2.

In state 2, the digital control DC sends a SELECT high and a NMOS on low signal as can be seen from the chronogram of FIG. 3. This means, that the S0 switch opens and the voltage in the junction point LX rapidly rises. Simultaneously the parasitic diode is no longer reversely biased, since VCC instead of VMAX is applied to the back gate of the PMOS transistor. The voltage in the junction point LX rises until the forward voltage of the parasitic diode is reached and a current flow via the parasitic diode limits the rise of the voltage in LX and protects the circuit elements from being destroyed due to an excessive voltage. This can be seen in state 2 in FIG. 3 as indicated by the tip by the LX voltage signal. This means, the storing of energy into the coil is stopped and all switches are off during this state. Hence one need to create a path between LX and the output voltage VCC in order to clamp the flyback on output LX.

In state 3, the S1 switch is closed since the PMOSon signal has transited from low to high, which means that the energy from the coil is discharged into the output capacitor connected on VCC. After a certain time T3, the discharging of the energy from the coil to the capacitor is stopped by a transition of the PMOSon signal from high to low thereby opening the S1 switch. Therefore, all switches become off during this state which means that one have again to create a path between VCC and LX in order to clamp the flyback on output LX until the current on the coil becomes zero. This is again achieved by the parasitic diode which limits the rise in the output voltage of LX.

Next, in state 5, after lapse of a certain time T2, the SELECT signal transits from high to low which means that VMAX is applied to the back gate of the PMOS transistor (S1 switch) and the parasitic diode is again reversely biased and the output voltage VCC of the coil is isolated.

If the digital control determines that the PUMP signal is still indicating a to low output voltage of the respective S1 switch, the switching sequence is repeated again.

When a S1 switch is selected ($SELECT_n$ high), the chronogram of FIG. 3 is performed. Only one S1 switch of all parallel S1 switches can be high in the same time, the other switches are mandatory low. When a S1 switch is not selected than it is in the state 1, i.e. turned off and with a parasitic diode which is reversely biased by applying VMAX to the bulk.

Hence, the negative influence of the parasitic diodes can be suppressed by a suitable selective control of the bulk voltage so that parasitic diodes are reversely biased if their transistors are turned off and are not reversely biased or forward biased, respectively, if the respective PMOS transistor is to be turned on during a switching sequence. In this way it is possible to provide reliable and compact DC/DC converter which can be used in a power management unit for mobile devices such as mobile phones, electronic cameras, laptops and the like.

It has to be appreciated that reference signs within the claims are only given for illustrative purpose and shall not be construed as limiting the scope of the method for which protection is thought.

The invention claimed is:

1. Voltage converter for converting a voltage to multiple output voltages, comprising
   a first switching circuit connected to an inductive energy storage element for allowing and interrupting a current flow through the inductive energy storage element;
   at least two second switching circuits for a controllable discharging of the energy stored in the inductive energy storage element each second switching circuit being connected to the inductive energy storage element in parallel connection to each other at its respective input and each second switching circuit (S1) comprising a parasitic element; and control voltage selection means for selectively supplying a control voltage to the parasitic element of the switching circuits such that a current flow through the parasitic element of the respective switching circuit is inhibited when the second switching circuit is turned off.

2. Voltage converter according to claim 1 further comprising a digital control for selectively operating the first and second switching circuits using digital control signals wherein each second switching circuit includes:

a level shifter which level shifter is responsive to a digital control signal;

a selection circuit associated to the control voltage selection means, said selection circuit is responsive to another digital control signal for the selective supply of the control voltage;

a PMOS transistor, which PMOS transistor comprises a gate connected to the level shifter and a backgate connected to the selection circuit; and a comparing means arranged for providing a digital output signal indicating that the output voltage has dropped below a reference voltage.

3. Voltage converter according to claim 1 wherein the control voltage selection means comprise a voltage determination circuit which determination circuit is adapted to determine the highest available voltage in the Voltage converter and is further adapted to provide the determined highest available voltage as the control voltage.

4. Voltage converter according to claim 1 wherein all elements are incorporated into one single IC chip package.

5. Power management unit comprising a voltage converter comprising a voltage converter according to claim 1.

6. Mobile device comprising a power management unit according to claim 5.

7. Method of operating a voltage converter for converting an input voltage to multiple output voltages according to claim 1 comprising the following steps:

storing of energy in the inductive energy storage element by means of the first switching circuit;

selectively discharging of the energy stored in the inductive energy storage element by means of the second switching circuits in order to produce multiple output voltages, each second switching circuit being connected to the inductive energy storage element in parallel connection to each other at its respective input side and each second switching circuit comprising a parasitic element; and selectively supplying of a control voltage to the parasitic element of the second switching circuits such that a current flow through the parasitic element of the respective switching circuit is inhibited when the second switching circuit is turned off.

8. Method according to claim 7 further comprising detecting that one output voltage of the second switching circuits has dropped below an associated reference voltage before the storing step;

turning on of the first switching circuit for allowing a current to charge the inductive energy storage element with energy;

selecting the second switching circuit associated with the detected output voltage;

applying of the detected output voltage to the selected second switching circuit;

turning off of the first switching circuit;

turning on of the selected second switching circuit for discharging the energy stored in the inductive energy storage element turning off of selected second switching circuit;

de-selecting the second switching circuit; and repeating steps a) to h) as long as the detected output voltage is lower than the associated reference voltage.

9. Method according to claim 7, wherein the highest available voltage in the voltage converter is determined and provided as the control voltage.

* * * * *